No. 671,858.  
J. DEVANTERY.  
WATER GAGE GLASS.  
(Application filed Mar. 24, 1900.)  
Patented Apr. 9, 1901.
(No Model.)
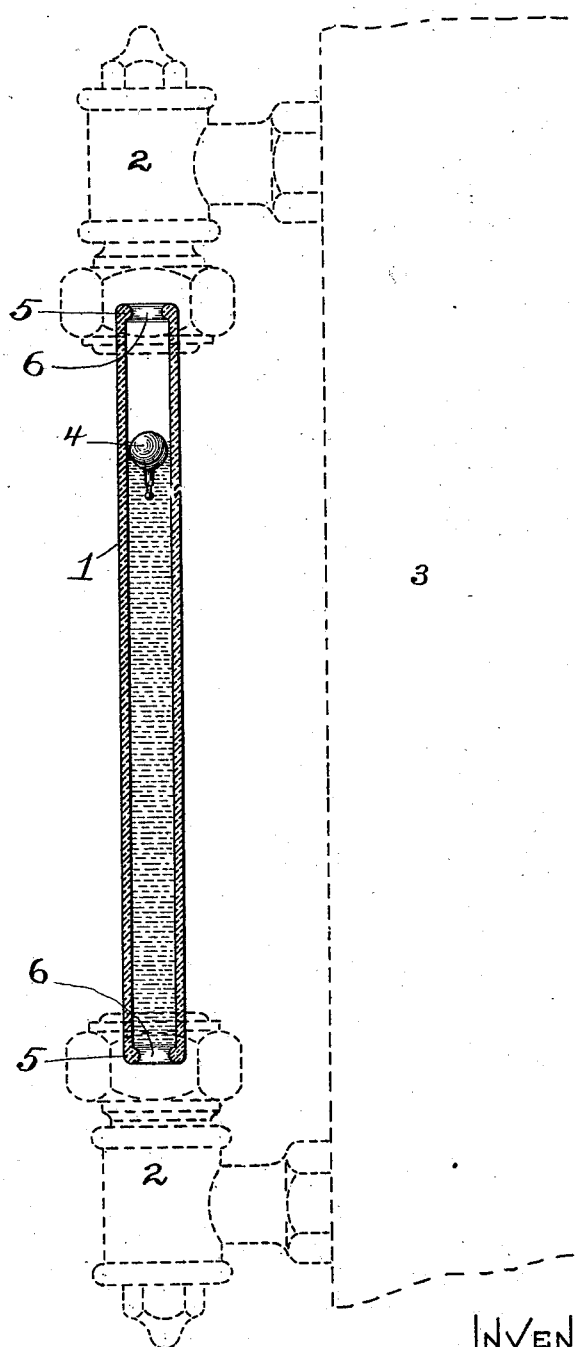
WITNESSES:  
INVENTOR:  
Joseph Devantery

UNITED STATES PATENT OFFICE.

JOSEPH DEVANTERY, OF BROOKLYN, NEW YORK, ASSIGNOR TO THE LOCOMOBILE COMPANY OF AMERICA, OF NEW YORK, N. Y.

WATER-GAGE GLASS.

SPECIFICATION forming part of Letters Patent No. 671,858, dated April 9, 1901.

Application filed March 24, 1900. Serial No. 10,005. (No model.)

*To all whom it may concern:*

Be it known that I, JOSEPH DEVANTERY, of Brooklyn, in the county of Kings and State of New York, have invented certain new and useful Improvements in Water-Gages, of which the following is a specification.

This invention relates to water-gages for steam-boilers of the kind employing the usual sight-tube and a float inclosed therein for indicating clearly the level of the water in said tube.

One object of the invention is to retain the float permanently within the tube.

The accompanying drawing represents a vertical sectional view of the glass and float of a gage embodying my improvements, the boiler and the remaining parts of the gage being shown in dotted lines.

1 designates the glass sight-tube of the gage. The fittings of the gage, in which the ends of the tube are secured, are represented in dotted lines at 2 2 and the boiler at 3.

4 is a suitable float, such as a hollow glass body, contained within the tube 1 and adapted to float upon the surface of the column of water in said tube, indicating by its position the height of said column. The use of a float within the sight-tube renders it desirable to employ some means to prevent the egress of said float from the tube and its lodgment in either of the fittings 2 2. This I accomplish in accordance with my present invention by turning the walls of the tube inwardly at their ends 5 5, leaving contracted orifices 6 6 of less than the internal diameter of the tube-body and less than the diameter of the float 4. The float is thereby prevented from escaping from the tube at either end of the latter. As the float is permanently retained within the tube, the tube and float can be supplied as a unit, thereby avoiding certain assembling and handling operations and dispensing with the use of separate retainers, such as have heretofore been employed to keep the float within the tube.

The ends of the glass are rounded when in a plastic state due to the application of heat, and an incidental effect of rounding the ends is to strengthen the glass and secure a better seat for its ends in the boiler-fittings. Gage-glasses are usually made by cutting a long tube into lengths, leaving surfaces of fracture on the ends of the glasses. Such glasses are liable to crack under pressure because of the minute secondary fractures which often accompany the main fracture or cleavage and because of the tendency of the sharp edges to chip and start these secondary fractures. By rounding over the ends the sharp edges are removed and the secondary fractures, if present at first, are obliterated. Furthermore, a glass with rounded ends is more easily packed and seated in the gage-fittings than one with abrupt ends and is less liable to break after being fitted.

Having thus explained the nature of my invention and described a way of constructing and using the same, though without attempting to set forth all of the forms in which it may be made or all the modes of its use, what I claim, and desire to secure by Letters Patent, is—

A gage-glass comprising a glass tube containing a float and having its edges at both ends rounded or turned inwardly to form contracted orifices which retain the float within the tube.

In testimony whereof I have affixed my signature in presence of two witnesses.

JOSEPH DEVANTERY.

Witnesses:
VICTOR E. SCHAUMBURG,
N. C. LYON.